(12) United States Patent
Ueta et al.

(10) Patent No.: US 11,878,704 B2
(45) Date of Patent: Jan. 23, 2024

(54) ELECTRONIC CONTROL DEVICE AND CONTROL METHOD

(71) Applicant: Hitachi Automotive Systems, Ltd., Hitachinaka (JP)

(72) Inventors: Taisuke Ueta, Tokyo (JP); Satoshi Tsutsumi, Tokyo (JP); Yuta Muto, Tokyo (JP); Hideyuki Sakamoto, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 722 days.

(21) Appl. No.: 17/044,937

(22) PCT Filed: Apr. 5, 2019

(86) PCT No.: PCT/JP2019/015199
§ 371 (c)(1),
(2) Date: Oct. 2, 2020

(87) PCT Pub. No.: WO2019/194312
PCT Pub. Date: Oct. 10, 2019

(65) Prior Publication Data
US 2021/0163027 A1    Jun. 3, 2021

(30) Foreign Application Priority Data
Apr. 5, 2018 (JP) .................. 2018-073248

(51) Int. Cl.
*B60W 50/035* (2012.01)
*B60W 50/02* (2012.01)
(Continued)

(52) U.S. Cl.
CPC ...... *B60W 50/035* (2013.01); *B60W 50/0205* (2013.01); *G07C 5/0808* (2013.01); *B60W 2050/0215* (2013.01); *G05D 1/0055* (2013.01)

(58) Field of Classification Search
None
See application file for complete search history.

(56) References Cited

U.S. PATENT DOCUMENTS 9,915,947 B1 * 3/2018 LaForge ............... G05D 1/0077
2002/0099487 A1    7/2002 Suganuma et al.
(Continued)

FOREIGN PATENT DOCUMENTS

JP    2001-260924 A    9/2001
JP    2002-221075 A    8/2002
(Continued)

OTHER PUBLICATIONS

International Search Report (PCT/ISA/210) issued in PCT Application No. PCT/JP2019/015199 dated May 14, 2019 with English translation (four (4) pages).
(Continued)

*Primary Examiner* — Adam D Tissot
*Assistant Examiner* — Garrett F Evans
(74) *Attorney, Agent, or Firm* — Crowell & Moring LLP

(57) ABSTRACT

An electronic control device is mounted on a vehicle equipped with a plurality of hardware capable of operation, and comprises an information collection unit which collects external information of the vehicle, a storage unit which stores a plurality of processing specifications which prescribe processing to be executed by each of the plurality of hardware and the external information to be used by the plurality of hardware for performing operation, and an applied condition, which is a condition related to the external information and a status of the plurality of hardware for applying each of the plurality of processing specifications, and a processing control unit which determines one processing specification among the plurality of processing specifications from a correspondence to the condition based (Continued)

on the collected external information and the status of the plurality of hardware, and controls the plurality of hardware based on the determined processing specification.

11 Claims, 11 Drawing Sheets

(51) Int. Cl.
    *G07C 5/08*     (2006.01)
    *G05D 1/00*     (2006.01)

(56) References Cited

U.S. PATENT DOCUMENTS

| | | | |
|---|---|---|---|
| 2012/0216208 A1 | 8/2012 | Takemura et al. | |
| 2018/0272963 A1* | 9/2018 | Meyhofer | G01S 17/931 |
| 2019/0163583 A1* | 5/2019 | Fahim | G06F 12/084 |

FOREIGN PATENT DOCUMENTS

| | | |
|---|---|---|
| JP | 2006-282072 A | 10/2006 |
| JP | 2011-100338 A | 5/2011 |
| JP | 2017-132285 A | 8/2017 |
| WO | WO 2008/062512 A1 | 5/2008 |

OTHER PUBLICATIONS

Japanese-language Written Opinion (PCT/ISA/237) issued in PCT Application No. PCT/JP2019/015199 dated May 14, 2019 (five (5) pages).

\* cited by examiner

FIG.5

| APPLICABLE CONDITION | | PROCESSING SPECIFICATION | EMPLOYED HARDWARE | | | ASSIGNMENT PROCESSING | | |
|---|---|---|---|---|---|---|---|---|
| SWITCHING CONDITION | SWITCHING PRIORITY | | CPU | GPU | LOGICAL CIRCUIT | CPU | GPU | LOGICAL CIRCUIT |
| AMBIENT ENVIRONMENT (GENERAL ROAD) | LOW | SPECIFICATION A | ○ | ○ | ○ | PROCESSING P | PROCESSING Q | PROCESSING R |
| AMBIENT ENVIRONMENT (EXPRESSWAY) | LOW | SPECIFICATION B | ○ | – | ○ | PROCESSING P | – | PROCESSING Q, R |
| SENSOR ACCURACY DEGRADATION | MEDIUM | SPECIFICATION C | ○ | ○ | ○ | ASSISTANCE Q | PROCESSING Q | PROCESSING R |
| CPU FAILURE | HIGH | SPECIFICATION D | – | ○ | ○ | – | PROCESSING Q | PROCESSING P, R |
| CAMERA FAILURE | HIGH | SPECIFICATION E | ○ | – | ○ | PROCESSING P | – | PROCESSING R |

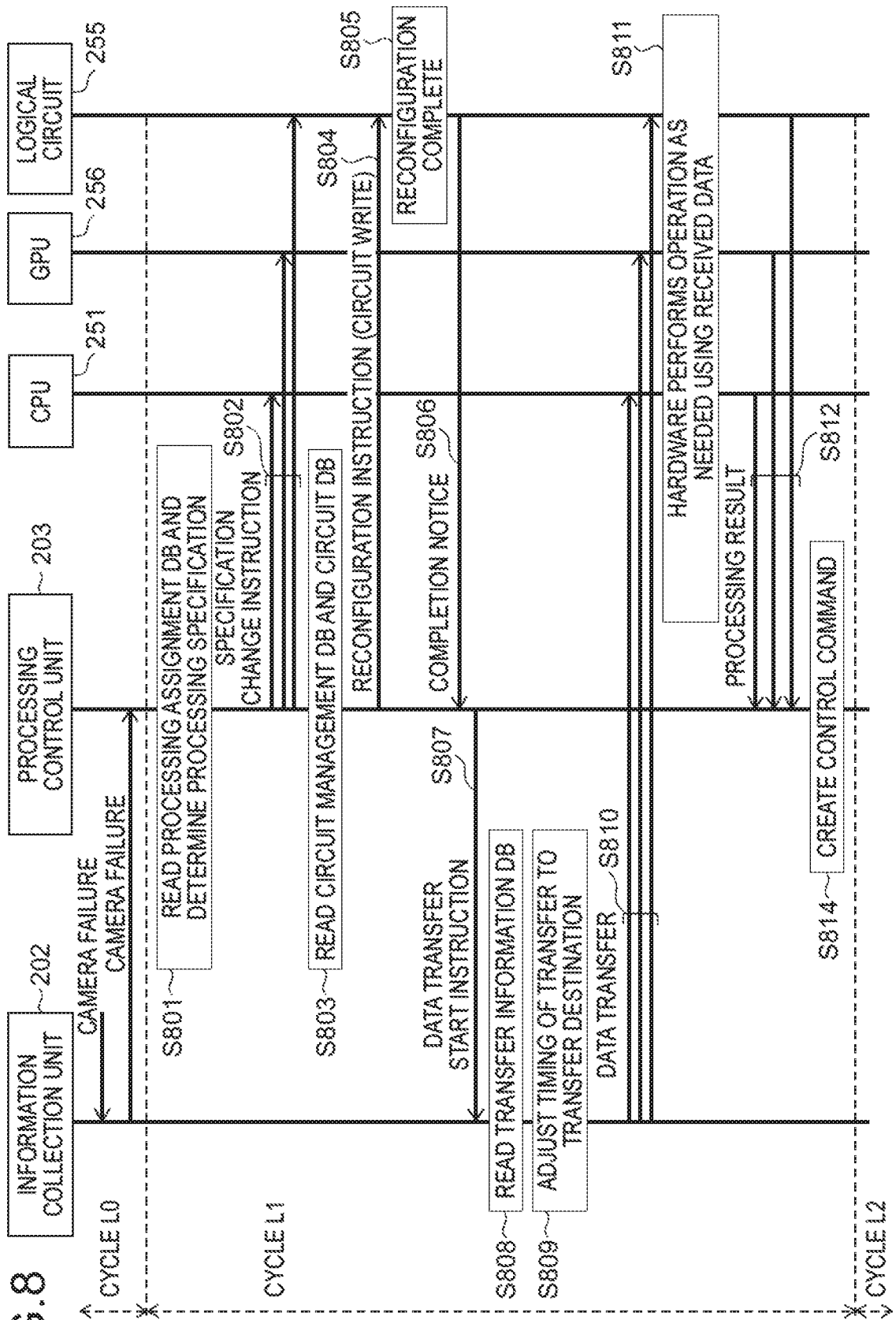

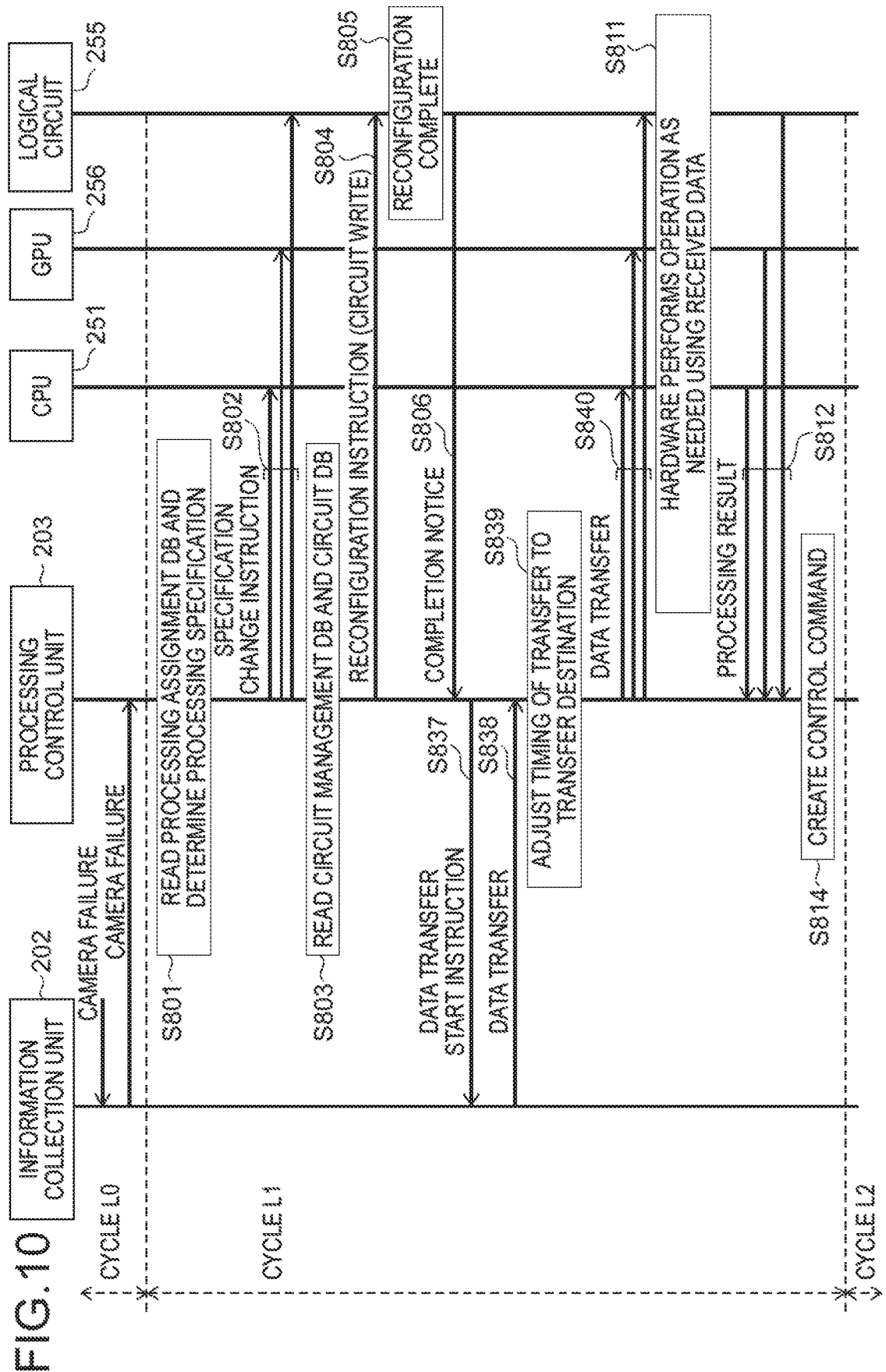

ELECTRONIC CONTROL DEVICE AND CONTROL METHOD

TECHNICAL FIELD

The present invention relates to an electronic control device and a control method.

BACKGROUND ART

Technology development aiming for the autonomous driving of vehicles is being promoted. In autonomous driving, the surroundings need to be recognized and the vehicle needs to be controlled on behalf of the driver, and sophisticated information processing is required. An autonomous vehicle is equipped with a plurality of sensors, and the external environment, such as the road and weather, is comprehended based on the information acquired from the respective sensors. PTL 1 discloses a vehicle driving control system for realizing the autonomous driving of a vehicle, wherein the vehicle includes a plurality of sensors for detecting external circumstances of the vehicle, the vehicle driving control system includes a processor and a memory, the memory stores a plurality of fusion specifications corresponding to an external environment of the vehicle, which are specifications for fusing the detection results of the plurality of sensors, and the processor selects one fusion specification corresponding to the external environment of the vehicle from the plurality of fusion specifications stored in the memory, presents, to a driver, an area in which a recognition accuracy of the sensors will deteriorate due to the external environment in the selected fusion specification as a weakness area of the selected fusion specification, fuses the detection results of the plurality of sensors based on the selected fusion specification, and controls the autonomous driving of the vehicle by recognizing the external circumstances of the vehicle.

CITATION LIST

Patent Literature

[PTL 1] Japanese Unexamined Patent Application Publication No. 2017-132285

SUMMARY OF THE INVENTION

Problems to be Solved by the Invention

With the invention described in PTL 1, it is not possible to optimally control hardware capable of operation according to the external environment and the status of hardware capable of operation.

Means to Solve the Problems

According to the 1st aspect of the present invention, an electronic control device to be mounted on a vehicle equipped with a plurality of hardware capable of operation, comprises: an information collection unit which collects external information of the vehicle; a storage unit which stores a plurality of processing specifications which prescribe processing to be executed by each of the plurality of hardware and the external information to be used by the plurality of hardware for performing operation, and an applicable condition, which is a condition related to the external information and a status of the plurality of hardware for applying each of the plurality of processing specifications; and a processing control unit which determines one processing specification among the plurality of processing specifications from a correspondence to the condition based on the collected external information and the status of the plurality of hardware, and controls the plurality of hardware based on the determined processing specification.

According to the 2nd aspect of the present invention, a control method to be executed by an electronic control device to be mounted on a vehicle comprising a plurality of hardware capable of operation, and comprising a storage unit which stores a plurality of processing specifications and an applicable condition, which is a condition for applying each of the plurality of processing specifications, wherein: the processing specification is used for prescribing processing to be executed by each of the plurality of hardware and external information of the vehicle to be used by the plurality of hardware for performing operation; the applicable condition is a condition related to the external information and a status of the plurality of hardware; and the control method includes: collecting external information of the vehicle; and determining one processing specification among the plurality of processing specifications from a correspondence to the condition based on the collected external information and the status of the plurality of hardware, and controlling the plurality of hardware based on the determined processing specification.

Advantageous Effects of the Invention

According to the present invention, it is possible to optimally control hardware capable of operation according to the external environment and the status of hardware capable of operation.

BRIEF DESCRIPTION OF DRAWINGS

FIG. 5 is a diagram showing an example of the processing assignment DB 3.

FIG. 8 is a sequence diagram showing the operation of the autonomous driving control device 2 in an embodiment.

FIG. 10 is a sequence diagram showing the operation of the autonomous driving control device 2 in modified example 2.

DESCRIPTION OF EMBODIMENTS

Embodiments

An embodiment of the autonomous driving control device according to the present invention is now explained with reference to FIG. 1 to FIG. 9E.

<System Configuration>

Figure 1:
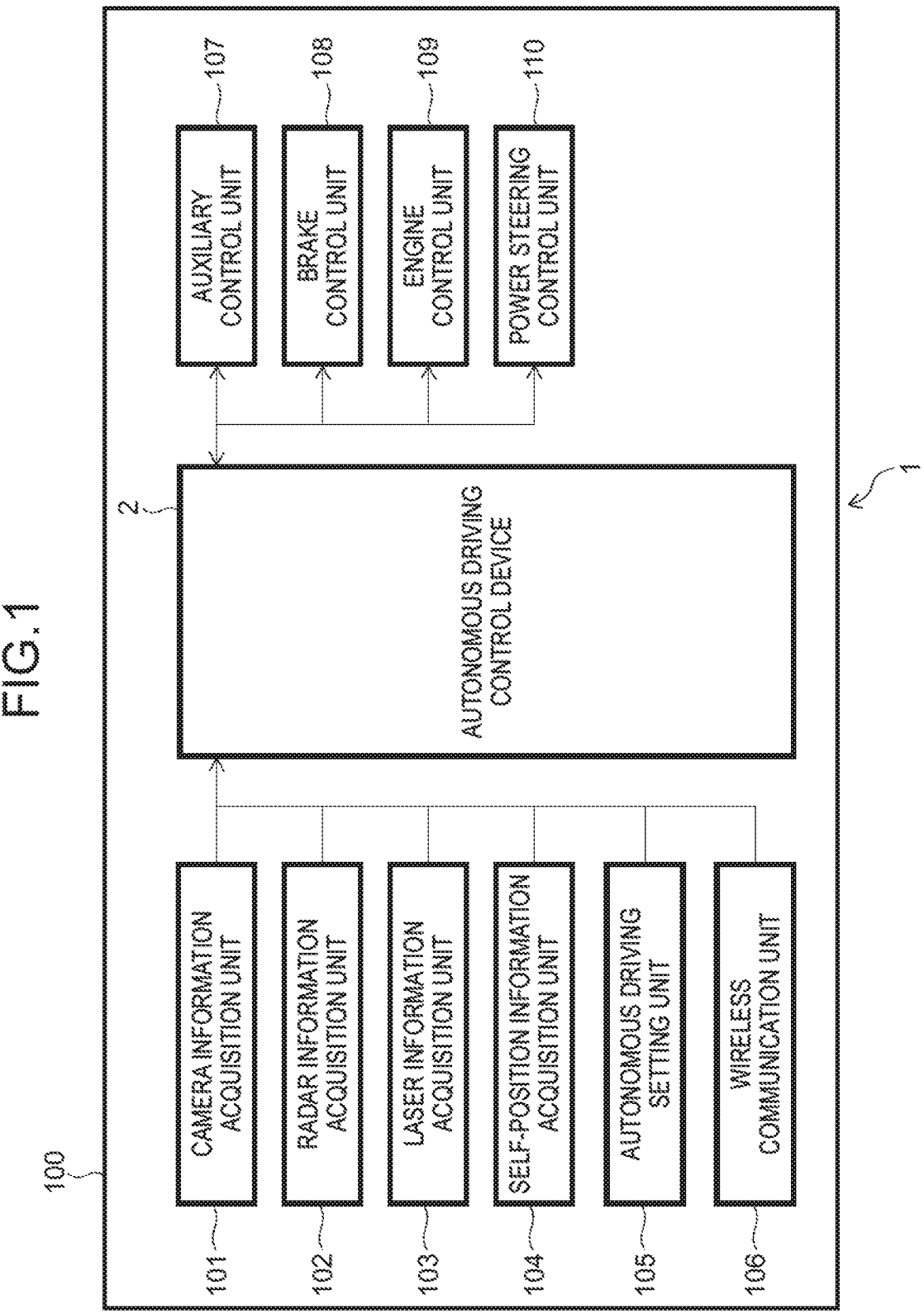
FIG. 1 is a system configuration diagram of the in-vehicle system 1.

FIG. 1 is a system configuration diagram of an in-vehicle system 1 including an autonomous driving control device 2. The in-vehicle system 1 is mounted on a vehicle 100, and comprises a camera information acquisition unit 101, a radar information acquisition unit 102, a laser information acquisition unit 103, and a self-position information acquisition unit 104 for detecting a position of the vehicle 100 by using a receiver of a satellite navigation system, such as a GPS (Global Positioning System), mounted on the vehicle 100. The vehicle 100 comprises a camera, a radar, and a laser (all not shown), and the camera information acquisition unit 101 acquires information of the environment outside the vehicle 100, for example, information related to the reflection of light in a visible light area, by using the foregoing camera. The radar information acquisition unit 102 acquires information of the environment outside the vehicle 100, for example, information related to the reflection of radio waves having a plurality of frequencies, by using the foregoing radar. The laser information acquisition unit 103 acquires information of the environment outside the vehicle 100, for example, information related to the reflection of infrared rays having a single frequency, by using the foregoing laser. The in-vehicle system 1 additionally comprises an autonomous driving setting unit 105 for setting the autonomous driving of the vehicle 100, and a wireless communication unit 106 for updating the information of the in-vehicle system 1 via OTA (Over-The-Air).

The in-vehicle system 1 additionally comprises an autonomous driving control device 2, an auxiliary control unit 107, a brake control unit 108, an engine control unit 109, and a power steering control unit 110. The autonomous driving control device 2, the auxiliary control unit 107, the brake control unit 108, the engine control unit 109, and the power steering control unit 110 are, for example, an ECU (Electronic Control Unit).

The camera information acquisition unit 101, the radar information acquisition unit 102, the laser information acquisition unit 103, the self-position information acquisition unit 104, the autonomous driving setting unit 105, the wireless communication unit 106, the autonomous driving control device 2, the auxiliary control unit 107, the brake control unit 108, the engine control unit 109, and the power steering control unit 110 are connected communicably to each other via a communication network, such as a CAN (Controller Area Network) (registered trademark), equipped in the vehicle 100.

The camera information acquisition unit 101, the radar information acquisition unit 102, the laser information acquisition unit 103, and the self-position information acquisition unit 104 send, to the autonomous driving control device 2, the information that they respectively received from a sensor or the like (this information is hereinafter referred to as the "sensor information"). Moreover, the camera information acquisition unit 101, the radar information acquisition unit 102, the laser information acquisition unit 103, and the self-position information acquisition unit 104 detect the abnormality or deterioration in accuracy of their sensors, and send, to the autonomous driving control device 2, information related to the abnormality or deterioration in accuracy of their sensors (this information is hereinafter referred to as the "abnormality detection information").

The autonomous driving setting unit 105 sends, to the autonomous driving control device 2, setting information such as the destination, route, and driving speed during autonomous driving. However, a part of the information sent by the autonomous driving setting unit 105 may also be received from the outside via the wireless communication unit 106.

The autonomous driving control device 2 performs processing for the autonomous driving control and outputs a control command based on the processing result to the brake control unit 108, the engine control unit 109, and the power steering control unit 110. The auxiliary control unit 107 assists in performing the same control as the autonomous driving control device 2. The brake control unit 108 controls the braking force of the vehicle 100. The engine control unit 109 controls the driving force of the vehicle 100. The power steering control unit 110 controls the steering of the vehicle 100.

When the autonomous driving control device 2 receives a setting request of autonomous driving from the autonomous driving setting unit 105, the autonomous driving control device 2 calculates the proper course to be traveled by the vehicle 100 based on information of the outside environment from the camera information acquisition unit 101, the radar information acquisition unit 102, the laser information acquisition unit 103, and the self-position information acquisition unit 104. Subsequently, the autonomous driving control device 2 outputs the control commands of the braking force, the driving force, and the steering to the brake control unit 108, the engine control unit 109, and the power steering control unit 110 so as to cause the vehicle 100 to travel along the calculated proper course. The brake control unit 108, the engine control unit 109, and the power steering control unit 110 receive the control commands from the autonomous driving control device 2, and thereafter respectively output operation signals to the actuators to be controlled (not shown).

<Hardware Configuration of Autonomous Driving Control Unit>

Figure 2:
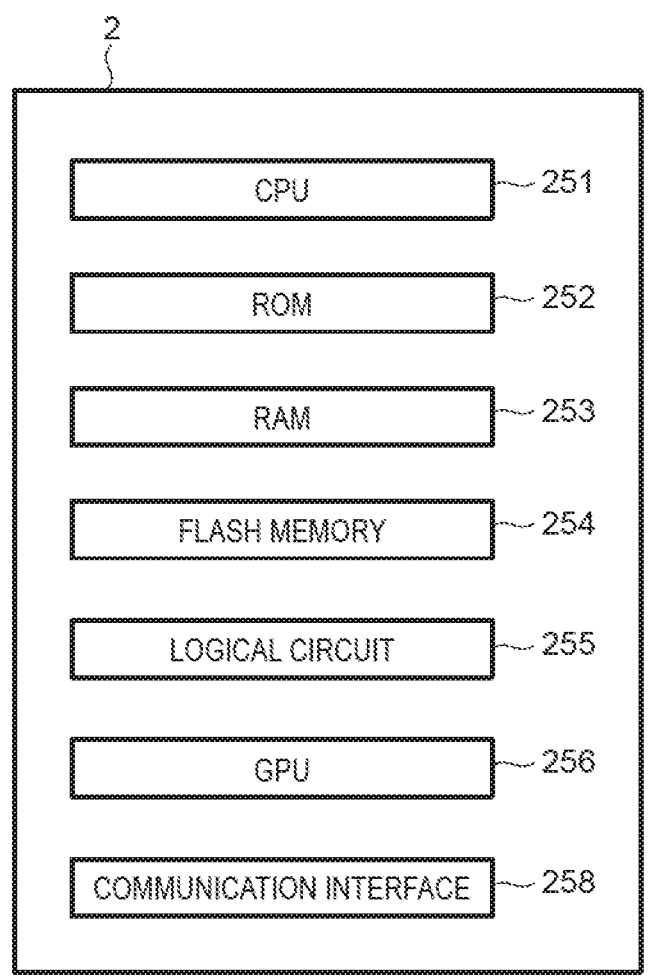
FIG. 2 is a hardware configuration diagram of the autonomous driving control device 2.

FIG. 2 is a hardware configuration diagram of the autonomous driving control device 2. The autonomous driving control device 2 comprises a CPU 251, a ROM 252, a RAM 253, a flash memory 254, a logical circuit 255, a GPU 256, and a communication interface 258. The CPU 251 and the GPU 256 realize the functions described later by loading the programs stored in the ROM 252 into the RAM 253 and executing the programs. The flash memory 254 is a non-volatile storage area, and is configured from a flash memory, a hard disk drive or the like. The logical circuit 255 is a reconfigurable logical circuit that uses a PLD (Programmable Logic Device) such as an FPGA (field-programmable gate array). The logical circuit 255 is a so-called partial reconfigurable logical circuit in which only a part thereof can be reconfigured. The communication interface 258 is an interface which communicates with a predetermined protocol such as a CAN.

Note that the hardware of the CPU 251, the ROM 252, the RAM 253, the flash memory 254, the logical circuit 255, and the GPU 256 configuring the autonomous driving control device 2 may respectively be configured on an ECU as one device, or a plurality of hardware may be configured on an ECU as one device in the form of a SoC (System on Chip). Moreover, the autonomous driving control device 2 may be configured from one ECU, or configured from a plurality of ECUs.

<Functional Configuration of Autonomous Driving Control Device>

Figure 3:
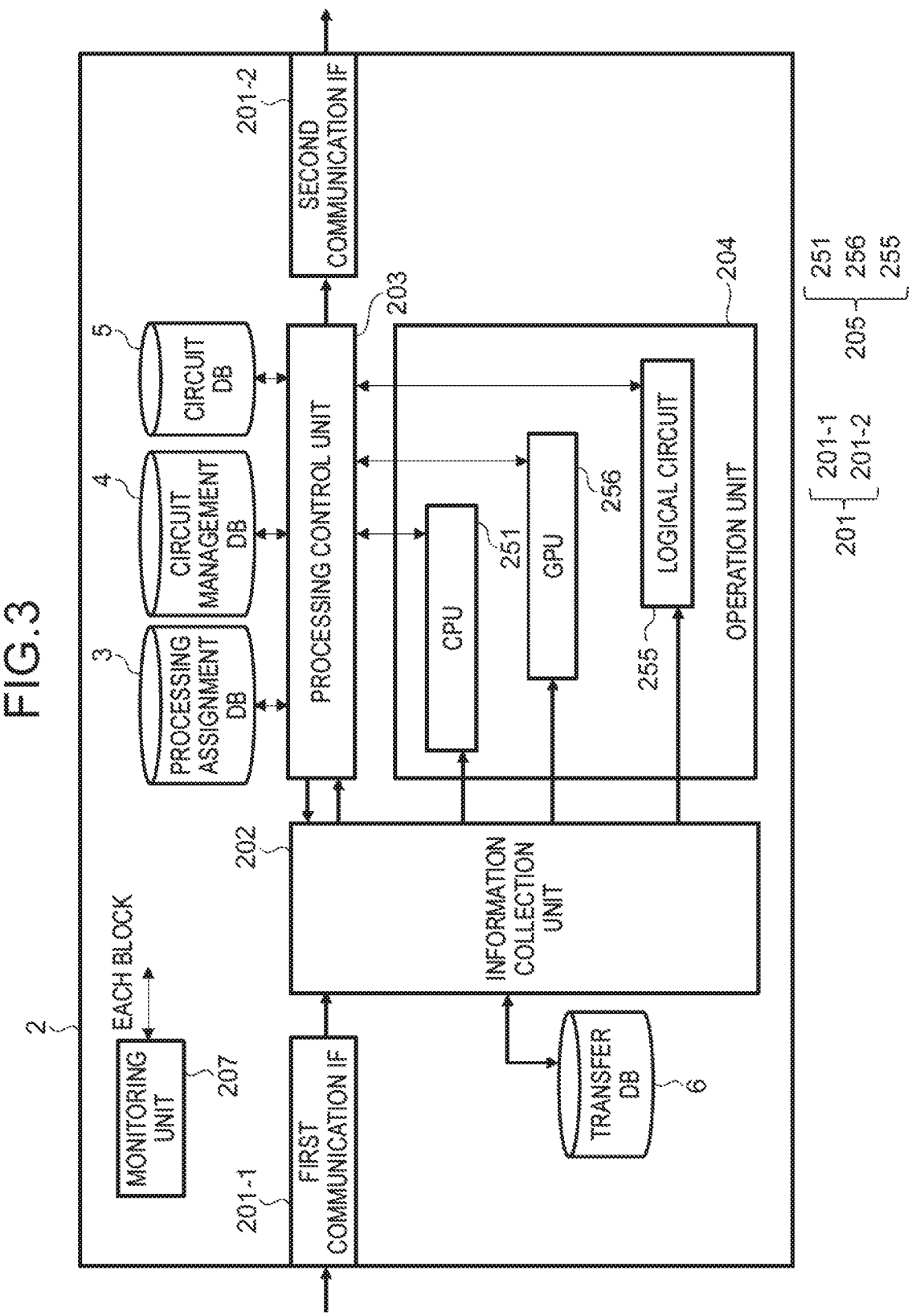
FIG. 3 is a functional configuration diagram of the autonomous driving control device 2.

FIG. 3 is a functional configuration diagram of the autonomous driving control device 2. The autonomous driving control device 2 includes a first communication interface 201-1, a second communication interface 201-2, an information collection unit 202, a processing control unit 203, an operation unit 204, a monitoring unit 207, a processing assignment database (this is hereinafter referred to as the "processing assignment DB") 3, a circuit management database (this is hereinafter referred to as the "circuit management DB") 4, a circuit database (this is hereinafter referred to as the "circuit DB") 5, and a transfer database (this is hereinafter referred to as the "transfer DB") 6. In the following explanation, the first communication interface 201-1 and the second communication interface 201-2 are collectively referred to as the "communication interface 201". Moreover, the CPU 251, the logical circuit 255, and the GPU 256 are collectively referred to as the hardware 205.

The communication interface 201 is realized with the communication interface 258 of FIG. 2. The processing assignment DB 3, the circuit management DB 4, the circuit DB 5, and the transfer DB 6 are information stored in the RAM 253 or the flash memory 254. The operation unit 204 is realized with the hardware 205. The information collection unit 202 and the processing control unit 203 are configured from one among the CPU 251, the logical circuit 255, and the GPU 256.

The autonomous driving control device 2 is connected to the camera information acquisition unit 101, the radar information acquisition unit 102, the laser information acquisition unit 103, the self-position information acquisition unit 104, the autonomous driving setting unit 105, and the wireless communication unit 106 of FIG. 1 via the first communication interface 201-1. The autonomous driving control device 2 is connected to the auxiliary control unit 107, the brake control unit 108, the engine control unit 109, and the power steering control unit 110 via the second communication interface 201-2. Note that, in FIG. 3, while the autonomous driving control device 2 comprises the two logical communication interfaces of the first communication interface 201-1 and the second communication interface 201-2, the autonomous driving control device 2 may also comprise only one logical communication interface equipped with both of their functions.

The information collection unit 202 collects the sensor information and abnormality detection information from the camera information acquisition unit 101, the radar information acquisition unit 102, the laser information acquisition unit 103, and the self-position information acquisition unit 104, and the autonomous driving setting information from the autonomous driving setting unit 105 which are input from the first communication interface 201-1. The information collection unit 202 refers to the transfer DB 6, and determines the hardware 205 to which the collected sensor information is to be transferred. However, the information collection unit 202 may send the collected sensor information not only to the hardware 205, but also to the processing control unit 203. The information collection unit 202 transfers the abnormality detection information and the autonomous driving setting information to the processing control unit 203.

The processing control unit 203 repeatedly executes the processing described later in a predetermined processing cycle. The abnormality detection information of the sensor from the information collection unit 202, the information of the defect of the hardware 205 from the monitoring unit 207, and the operation result from the operation unit 204 are input to the processing control unit 203. The processing control unit 203 determines the processing to be performed by the hardware 205 based on the abnormality detection information of the sensor, the defect information of the hardware 205, and the operation result of the operation unit 204 which are input.

Specifically, the processing control unit 203 determines the effective processing specification according to the switching condition and the switching priority described in the processing assignment DB 3, and causes the hardware 205 to execute the processing corresponding to the determined processing specification. When using the logical circuit 255, the processing control unit 203 additionally refers to the circuit management DB 4, and determines the number of logical circuits to configure the logical circuit 255 and the circuit data. The number of logical circuits and the circuit data are uniformly defined based on the determined effective processing specification. Details will be described later.

There may be cases where the processing to be executed by the logical circuits configuring the logical circuit 255 is the processing that had been previously executed by other hardware, for example, by the CPU 251 or the GPU 256. The circuit data for configuring the logical circuits in the logical circuit 255 is stored in the circuit DB 5. Moreover, the processing control unit 203 cyclically instructs the information collection unit 202 to transfer the sensor information to the hardware 205. The processing control unit 203 acquires the processing result from the hardware 205, and outputs, from the second communication interface 201-2, control commands of the braking force and the driving force based on the acquired processing result.

The hardware 205 configuring the operation unit 204 performs the processing determined by the processing control unit 203, with the sensor information acquired by the information collection unit 202 as the processing target, and sends the processing result to the processing control unit 203. The hardware 205 analyzes the external information collected by the sensor and determines the external circumstances, for example, the classification of the road. For example, the hardware 205 determines that the vehicle 100 is running on a general road, or the vehicle 100 is running on an expressway. The monitoring unit 207 monitors the status of the hardware 205 and, upon detecting a defect, transmits information regarding the defect to the processing control unit 203. For example, the monitoring unit 207 transmits a message to the processing control unit 203 to the effect that the CPU 251 has failed.

<Configuration Example of Operation Unit>

Figure 4A:
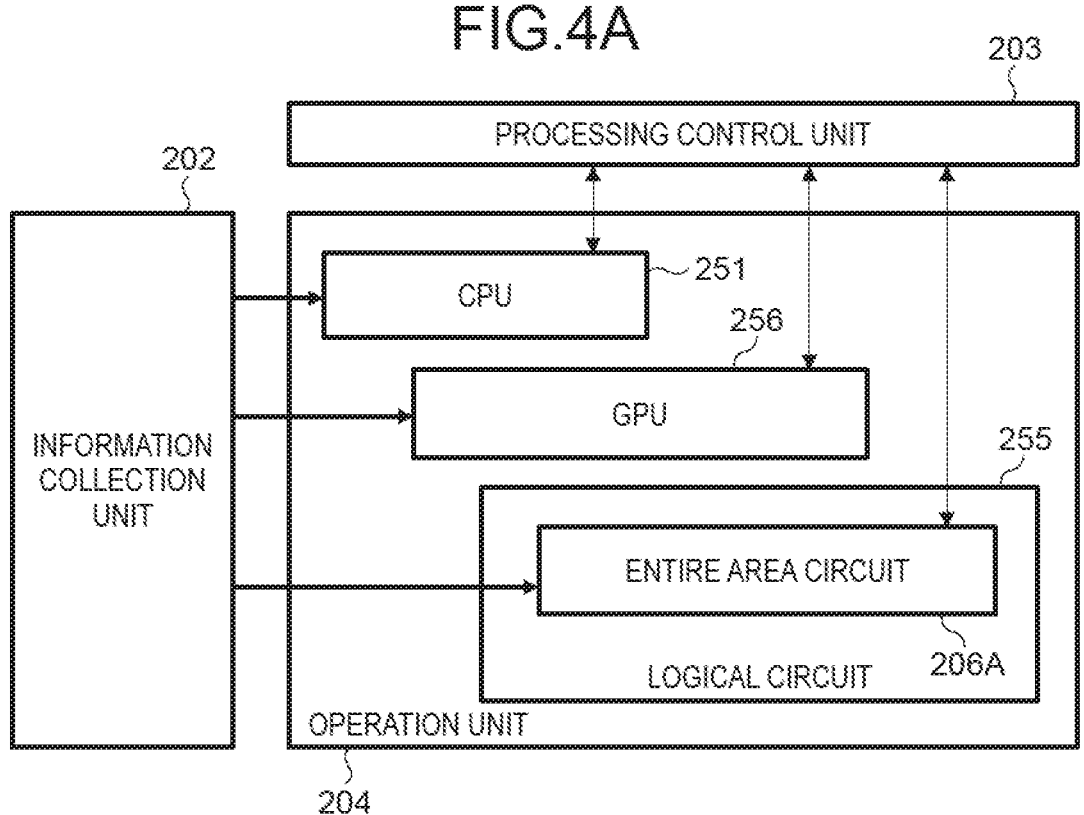
FIG. 4A is a diagram showing a configuration example of the hardware 205 when one logical circuit is configured in the logical circuit 255.
Figure 4B:
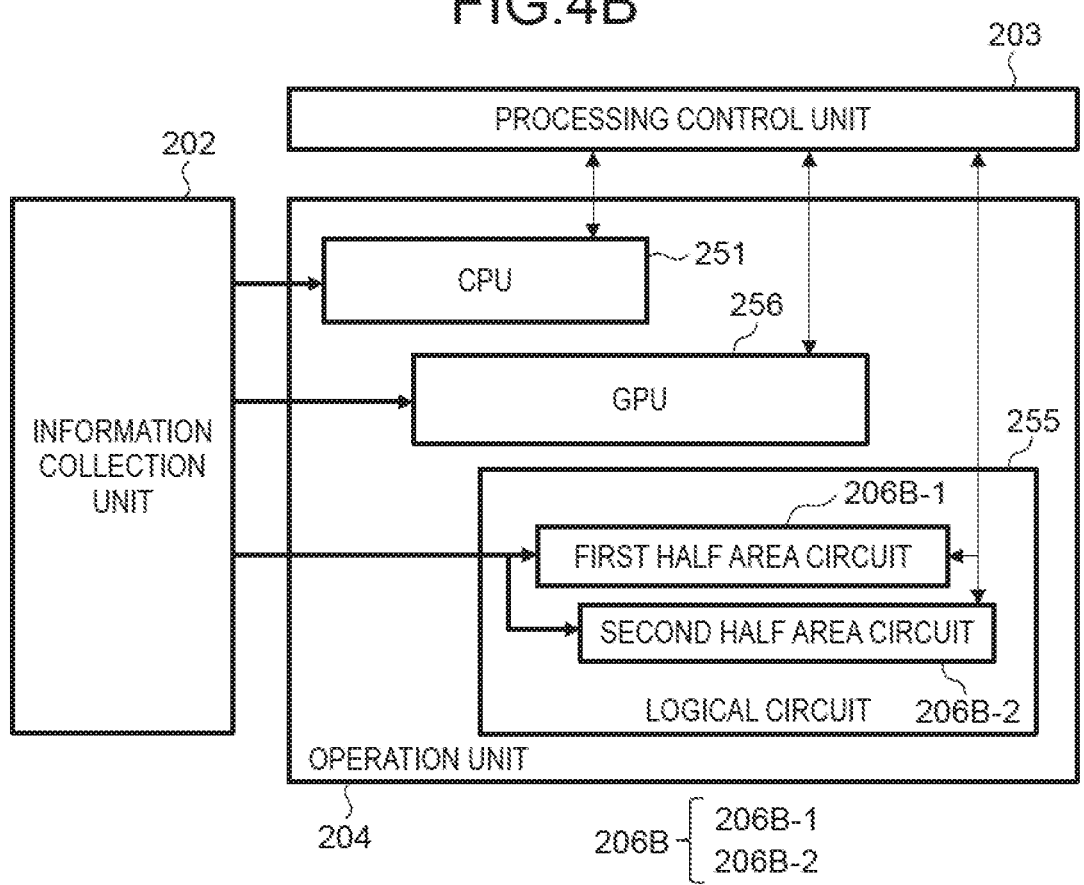
FIG. 4B is a diagram showing a configuration example of the hardware 205 when two logical circuits are configured in the logical circuit 255.

FIG. 4A and FIG. 4B are diagrams showing a configuration example of the hardware 205 in the operation unit 204. FIG. 4A is a diagram showing an example when one logical circuit; that is, an entire area circuit 206A, is configured in the logical circuit 255, and FIG. 4B is a diagram showing an example when two logical circuits; that is, a first half area circuit 206B-1 and a second half area circuit 206B-2, are configured in the logical circuit 255. Note that the names of the entire area circuit 206A, the first half area circuit 206B-1, and the second half area circuit 206B-2 are used for the sake of convenience, and the entire area circuit 206A does not need to use the entire area of the logical circuit 255. Similarly, the first half area circuit 206B-1 and the second half area circuit 206B-2 do not need respectively use half of the logical circuit 255, and the names merely show that two logical circuits are configured in the logical circuit 255. In the following explanation, the first half area circuit 206B-1 and the second half area circuit 206B-2 are collectively referred to as the half area circuit 206B.

In the example shown in FIG. 4A, the entire area circuit 206A is configured in the logical circuit 255, and the logical circuit 255 inputs the acquired sensor information in the entire area circuit 206A. In the example shown in FIG. 4B, the first half area circuit 206B-1 and the second half area circuit 206B-2 are configured in the logical circuit 255, and the logical circuit 255 inputs the sensor information in the first half area circuit 206B-1 or the second half area circuit 206B-2 based on the type of the acquired sensor information. The first half area circuit 206B-1 and the second half area circuit 206B-2 respectively process the input sensor information, and output the result to the processing control unit 203.

<Management Information of Processing Assignment Database>

FIG. 5 is a diagram showing an example of the processing assignment DB 3. The processing assignment DB 3 is a database that is referenced by the processing control unit 203, and stores the processing contents to be assigned to the hardware 205 based on the processing specification. The processing assignment DB 3 has the fields of applicable condition 300, processing specification 303, employed hardware 304, and assignment processing 305. Only one processing specification among the plurality of processing specifications 303 described in the processing assignment DB 3 is activated.

The applicable condition 300 is a combination of the switching condition 301 and the switching priority 302. The switching condition 301 stores the sensor information and the abnormality detection information acquired by the autonomous driving control device 2, and the switching condition of the effective processing specification that is determined based on the status of the hardware 205. The switching condition 301 is, for example, classification of the current location of the vehicle 100, driving speed of the vehicle 100, weather, brightness, remaining amount of fuel or batteries, defect of a sensor such as a camera, or defect of the hardware 205. However, switching of the effective processing specification is performed by giving consideration not only to the switching condition 301, but also to the subsequent switching priority 302.

The values of the field of the switching condition 301 illustrated in FIG. 5 are now explained. The "ambient environment (general road)" shown in the first line indicates that the ambient environment of the vehicle 100 is a general road; to put it differently, that the current location of the vehicle 100 is on a general road. The "ambient environment (expressway)" shown in the second line indicates that the ambient environment of the vehicle 100 is a general road; to put it differently, that the current location of the vehicle 100 is on an expressway. The "sensor accuracy degradation" shown in the third line indicates that the detection accuracy of one of the sensors has deteriorated. The "CPU failure" shown in the fourth line indicates that there is some kind of defect in the CPU 251. The "camera failure" shown in the fifth line indicates that one of the cameras is inoperable.

The switching priority 302 stores information regarding the priority of switching the processing specification. The priority is expressed, for example, with a number or a character in which the order can be determined, and, for example, "medium" is given preference over "low", and "high" is given further preference over "medium". For instance, in the example shown in FIG. 5, when the switching condition 301 corresponds to both the specification A and the specification C, the specification C in which the value of the field of the switching priority 302 is of a higher priority is activated.

The processing specification 303 stores the name of each processing specification in the processing assignment DB 3. However, the method of combining the values obtained from the respective sensors; that is, the specification of sensor fusion, may also be determined based on the values stored in the processing specification 303. To put it differently, the information stored in the processing specification 303 may function simply as a label for identifying the processing specification, or may include additional information. The employed hardware 304 stores the information of the hardware 205 used in the processing specification 303. In the example shown in FIG. 5, "○" is indicated in the column of the hardware 205 that will be used, and "−" is indicated in the column of the hardware 205 that will not be used.

The assignment processing 305 stores information of the processing to be assigned to each hardware 205; to put it differently, information of the processing to be performed in each hardware. Note that the programs to be executed by the CPU 251 and the GPU 256 are stored in the ROM 252 as described above, and the processing control unit 203 causes the proper programs to be loaded in the CPU 251 and the GPU 256 from the ROM 252 in accordance with the processing to be executed by the CPU 251 and the GPU 256. The processing of the logical circuit 255 will be described later.

The examples shown in the last line of FIG. 5 are now explained in detail. Since the field of the switching condition 301 is "sensor failure detection", this shows that the reception of information to the effect that the camera has failed from the camera information acquisition unit 101, the radar information acquisition unit 102, the laser information acquisition unit 103, or the self-position information acquisition unit 104 is the switching condition of the hardware 205. Furthermore, "high" is stored in the field of the switching priority 302, and this shows that the priority of changing the processing specification to "specification E", as shown in the field of the processing specification 303, is high. "○", "-", "○" are stored in order from left to right in the field of the employed hardware 304, and this shows that the CPU 251 and the logical circuit 255 are used, but the GPU 256 is not used. The field of the assignment processing 305 shows that the CPU 251 performs "processing P", the GPU 256 does not perform any processing, and the logical circuit 255 performs "processing R".

Note that the processing assignment DB 3 shown in FIG. 5 is an example, and the number of pieces of information configuring the employed hardware 304 and information configuring the assignment processing 305 may be other than 3 pieces of information. In other words, the employed hardware 304 and the assignment processing 305 may be configured from 2 pieces or information, or from 4 or more pieces of information. Moreover, it is also possible to omit the column of the employed hardware 304, and make the determination depending on whether some kind of information is described in the column of the assignment processing 305.

<Management Information of Circuit Management Database>

Figure 6:
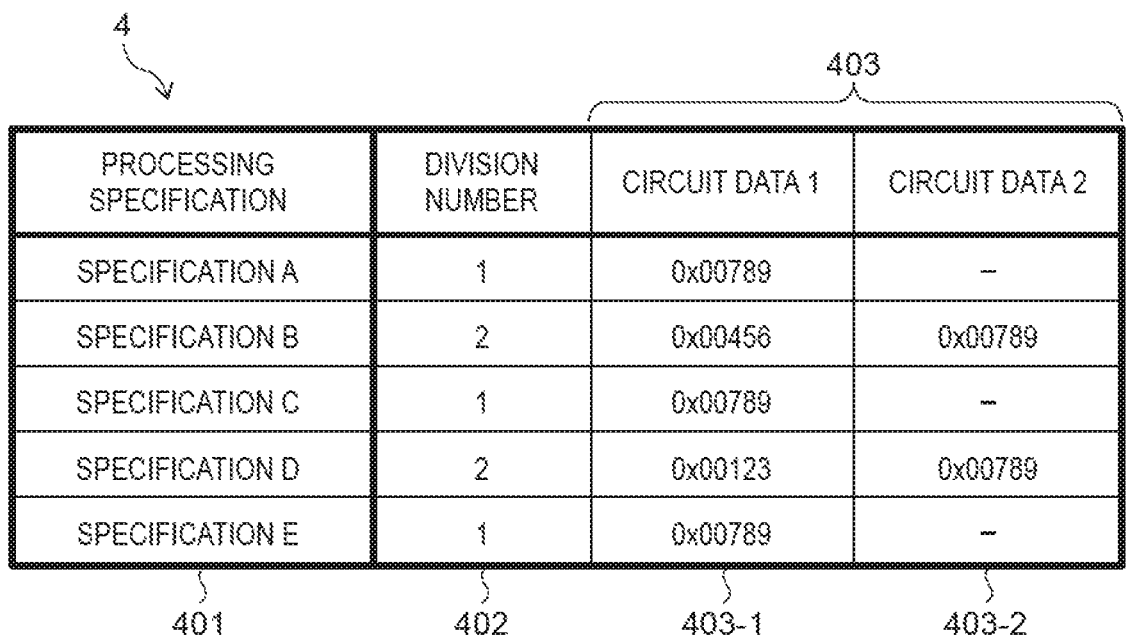
FIG. 6 is a diagram showing an example of the circuit management DB 4.

FIG. 6 is a diagram showing an example of the circuit management DB 4. The circuit management DB 4 is a database that is referenced by the processing control unit 203, and stores information such as the division number of the logical circuit 255 and the circuit data to be used. Here, shown is an example of using the logical circuit(s) in the logical circuit 255 as illustrated in FIG. 4A and FIG. 4B.

The circuit management DB 4 has the fields of division number 402 and circuit data 403 for each processing specification 401. The processing specification 401 is the same as the processing specification 303 shown in FIG. 3. The division number 402 stores the number of dividing the logical circuit (entire area circuit 206A or half area circuit 206B) configuring the logical circuit 255 according to the processing specification 401. The circuit data 403 stores information identifying the circuit data of the logical circuit configuring the logical circuit 255 according to the processing specification 401. Specifically, the circuit data 403 stores the address information of the circuit data stored in the circuit DB 5. When the division number 402 is "1" it indicates that the logical circuit will not be divided, and one circuit data is stored in the circuit data 403. In the foregoing case, "-" is stored in the circuit data 403-2 indicating the second circuit data to show there is no such second circuit data.

For instance, in the example of the first line shown in FIG. 6, "specification A" is stored in the processing specification 401, "1" is stored in the division number 402, "0x00789" is stored in the circuit data 403-1, and "-" is stored in the circuit data 403-2. In other words, when the processing specification is the specification A, this example shows that only one logical circuit is configured in the logical circuit 255, and the circuit data thereof is read from the address "0x00789" of the circuit DB 5. Note that, while the division number in the example of the circuit management DB 4 shown in FIG. 6 is 1 or 2, the division number may also be 3 or more. In the foregoing case, columns of the circuit data are provided in correspondence with the division number.

<Management Information of Transfer Database>

Figure 7:
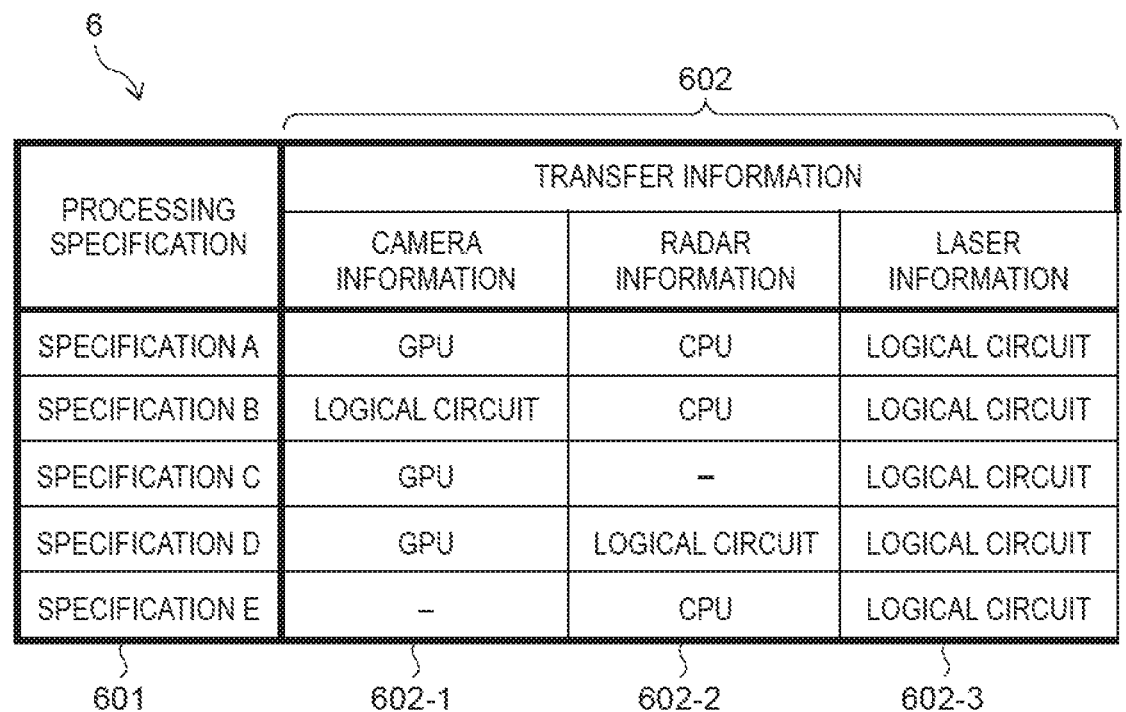
FIG. 7 is a diagram showing an example of the transfer DB 6.

FIG. 7 is a diagram showing an example of the transfer DB 6. The transfer DB 6 is a database that is referenced by the information collection unit 202, and stores information of the hardware 205 of the transfer destination of the sensor information collected from the camera information acquisition unit 101, the radar information acquisition unit 102, the laser information acquisition unit 103, and the self-position information acquisition unit 104. FIG. 7 shows to which one among the CPU 251, the GPU 256, and the logical circuit 255 the camera information, the radar information, and the laser information respectively acquired from the camera information acquisition unit 101, the radar information acquisition unit 102, and the laser information acquisition unit 103 are to be transferred.

The transfer DB 6 has a field of transfer information 602 for each processing specification 601. The processing specification 601 is the same as the processing specification 303 shown in FIG. 3. The transfer information 602 stores information of the hardware 205 of the transfer destination of the camera information, the radar information, and the laser information acquired respectively from the camera information acquisition unit 101, the radar information acquisition unit 102, and the laser information acquisition unit 103 according to the processing specification 601. However, when no information is to be transferred, information showing that transfer is not required, such as "-", is stored.

The example of FIG. 7 shows that, for example, when the processing specification 601 is the specification C, the camera information is to be transferred to the GPU 256, the radar information does not need to be transferred, and the laser information is to be transferred to the logical circuit 255.

<Operation Sequence>

FIG. 8 is a sequence diagram showing the operation of the information collection unit 202, the processing control unit 203, and the hardware 205 of the autonomous driving control device 2. Note that, while not shown in FIG. 8, the monitoring unit 207 is also operating ongoingly and, upon detecting a defect in the hardware 205, the monitoring unit 207 transmits information regarding the defect to the processing control unit 203. Specifically, FIG. 8 corresponds to the configuration example of the hardware 205 in the operation unit 204 shown in FIG. 4 within the autonomous driving control device 2, and is an operation overview, and a transition diagram thereof, of the information collection unit 202, the processing control unit 203, the CPU 251, the GPU 256, and the logical circuit 255 using the processing assignment DB 3 shown in FIG. 5, the circuit management DB 4 and the circuit DB 5 shown in FIG. 6, and the transfer DB 6 shown in FIG. 7.

FIG. 8 shows the operation of the autonomous driving control device 2 in a cycle L1, and the immediately preceding processing cycle is a cycle L0, and the immediately following processing cycle is a cycle L2. In the cycle L0, the effective processing specification was determined to be the specification A. Thus, in the cycle L0, as shown in the first line of FIG. 5, the processing P is to be executed by the CPU 251, the processing Q is to be executed by the GPU 256, and the processing R is to be executed by the logical circuit 255. In other words, in the cycle L0, the logical circuit for performing the processing R is configured in the logical circuit 255. In the final stage of the cycle L0, information to the effect that the camera has failed is input from the camera information acquisition unit 101 to the information collection unit 202, and this information is transmitted from the information collection unit 202 to the processing control unit 203.

In the cycle L1, the processing control unit 203 foremost reads the processing assignment DB 3, and determines the effective processing specification 303 based on the switching condition 301 and the switching priority 302 (S801). Since the processing control unit 203 has acquired information to the effect that the camera has failed in the final stage of the cycle L0, the processing control unit 203 determines that, as with the cycle L0, this corresponds to the switching condition of the specification A, and additionally corresponds to the switching condition of the specification D. Furthermore, with regard to the switching priority, since the specification D is "high" and is of a higher priority than the specification A, the processing control unit 203 determines that the specification D is the effective processing specification.

Next, since the processing specification in the cycle L1 has been changed from the processing specification of the immediately preceding cycle L0, the processing control unit 203 sends a specification change instruction to the CPU 251, the GPU 256, and the logical circuit 255 (S802). Specifically, the processing control unit 203 instructs the CPU 251 change "processing P" to "no processing", gives no change instruction to the GPU 256 since there is no change from the processing Q for the GPU 256, and instructs the logical circuit 255 to change "processing R" to "processing P, R".

Next, the processing control unit 203 reads the circuit management DB 4 and the circuit DB 5 in order to reconfigure the logical circuit (S803). More specifically, since the specification D is the effective processing specification, the processing control unit 203 acquires the circuit data from the addresses of 0x00123 and 0x00789 of the circuit DB5 according to the descriptions on the line of the specification D in the circuit management DB 4.

Next, the processing control unit 203 notifies, to the logical circuit 255, a reconfiguration instruction including the two circuit data acquired in S803 (S804). When the writing of the two circuit data that was received; that is, when the reconfiguration of the logical circuit 255, is completed (S805), the logical circuit 255 sends a completion notice to the processing control unit 203 (S806).

When the processing control unit 203 receives the reconfiguration completion notice from the logical circuit 255, the processing control unit 203 sends, to the information collection unit 202, a data transfer start instruction including the information "specification D" of the processing specification 303 determined in step S801 (S807). The information collection unit 202 reads the transfer DB 6 in order to determine the hardware 205 of the transfer destination (S808). Since the processing specification included in the data transfer start instruction is the specification D, the processing control unit 203 refers to the line of the specification D of the transfer processing DB 6, and determines that the transfer destination of the camera information shown with reference numeral 602-1 is the "GPU 256", the transfer destination of the radar information shown with reference numeral 602-2 is the "logical circuit 255", and the transfer destination of the laser information shown with reference numeral 602-3 is the "logical circuit 255".

Next, the information collection unit 202 adjusts the transfer timing of transferring the data to the hardware 205 of each transfer destination (S809), and then transfers the data (S810). The information collection unit 202 adjusts the timing of transferring data to the hardware 205 of each transfer destination by giving consideration to the processing performance and the processing time which differ depending on the type of hardware, such as whether the processor is a CPU or a GPU, and whether the PLD logical circuit is an FPGA or the like. In the cycle L1 of FIG. 8, the information collection unit 202 transfers the camera information to the GPU 256 and transfers the radar information and the laser information to the logical circuit 255, but does not transfer any data to the CPU 251.

Each hardware 205 performs arithmetic processing as needed using the received data (S811), and notifies the processing result to the processing control unit 203 (S812). Specifically, the GPU 256 notifies the processing result of the camera information to the processing control unit 203, and the logical circuit 255 notifies the processing result of the radar information and the laser information to the processing control unit 203. The processing control unit 203 that received the processing result outputs a command control value based on the received processing result (S814), ends the operation in the cycle L1, and starts the processing of the cycle L2. This concludes the explanation of the transition diagram shown in FIG. 8.

Note that, in FIG. 8, while a case of the effective processing specification being changed was explained, steps S803 to S806 may be omitted in cases where a logical circuit is not used or the logical circuit is not reconfigured. Furthermore, when the effective processing specification is not changed, steps S802 to S806 may be omitted.

<Conceptual Diagram of Acquired Information and Hardware Association>

FIG. 9 is a conceptual diagram showing the association of the acquired information in the in-vehicle system 1 and the hardware 205 of the autonomous driving control device 2. Specifically, FIG. 9 is a conceptual diagram showing the changes in the association between the camera information, the radar information, and the laser information respectively acquired from the camera information acquisition unit 101, the radar information acquisition unit 102, and the laser information acquisition unit 103 when the information collection unit 202, the processing control unit 203, the CPU 251, the GPU 256, and the logical circuit 255 perform the operations shown in FIG. 8 within the autonomous driving control device 2, and the CPU 251, the GPU 256, and the logical circuit 255 to process the foregoing information.

FIG. 9A to FIG. 9E respectively show the association of the acquired information in the in-vehicle system 1 and the hardware 205 of the autonomous driving control device 2 in cases where the processing specification 303 of the processing assignment DB 3 shown in FIG. 5 is "specification A" to "specification E".

Figure 9A:
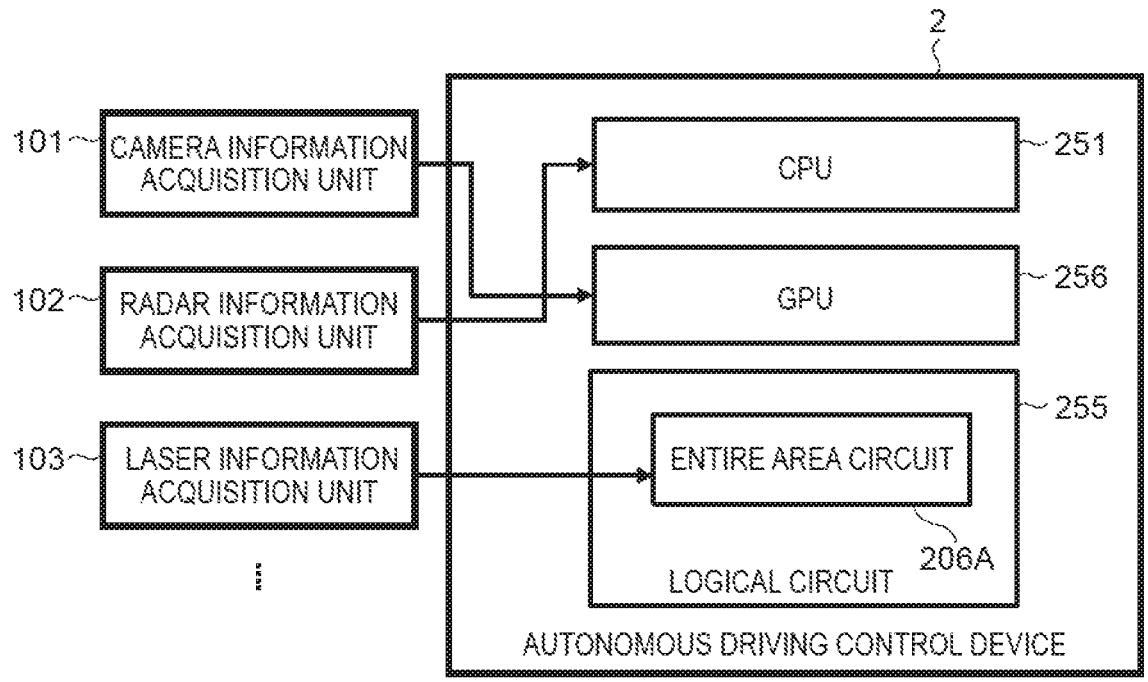
FIG. 9A is a diagram showing the association of the acquired information and the hardware 205 based on the specification A.
Figure 9B:
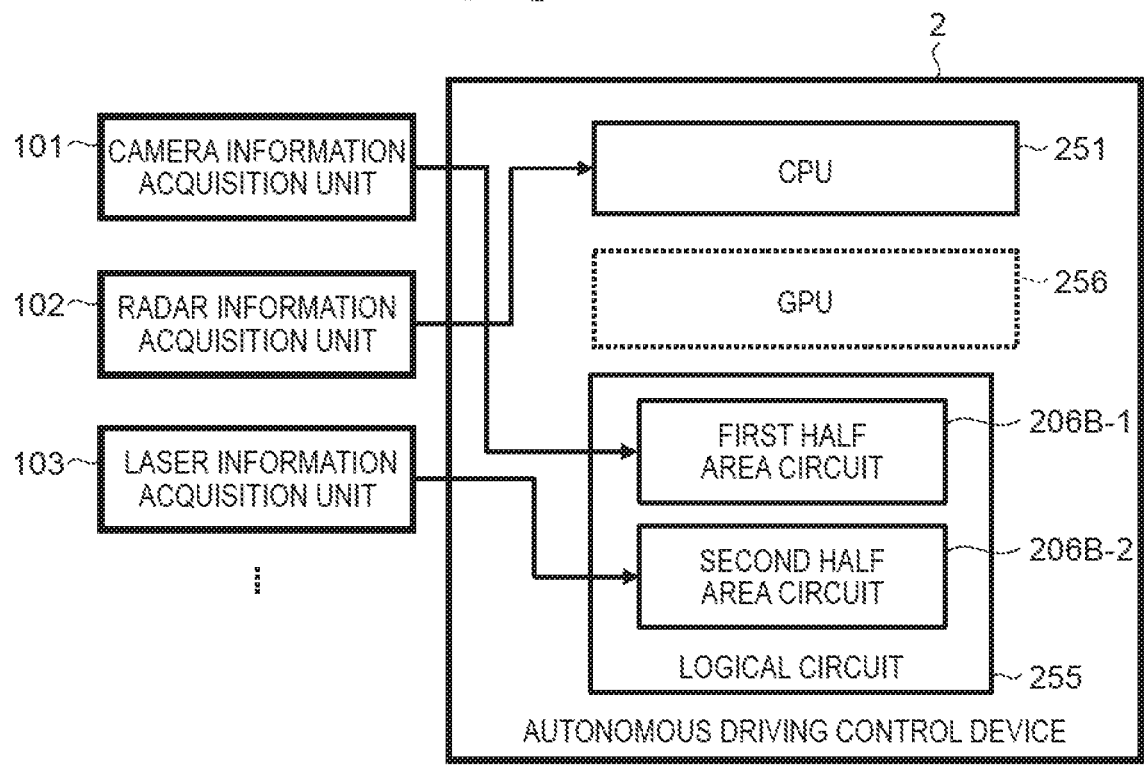
FIG. 9B is a diagram showing the association of the acquired information and the hardware 205 based on the specification B.

FIG. 9A is a diagram showing a case when the processing specification 303 is the "specification A", and shows that, when the vehicle is running on a general road, the camera information is processed by the GPU 256, the radar information is processed by the CPU 251, and the laser information is processed by the logical circuit 255. FIG. 9B is a diagram showing a case when the processing specification 303 is the "specification B", and shows that, when the vehicle is running on an expressway, the radar information is processed by the CPU 251, and the camera information and the laser information are processed by the two logical circuits configured in the logical circuit 255. For instance, this example shows that the processing specification of the camera information and the laser information is mitigated, and the power consumption is reduced as a result of not using the GPU 256.

Figure 9C:
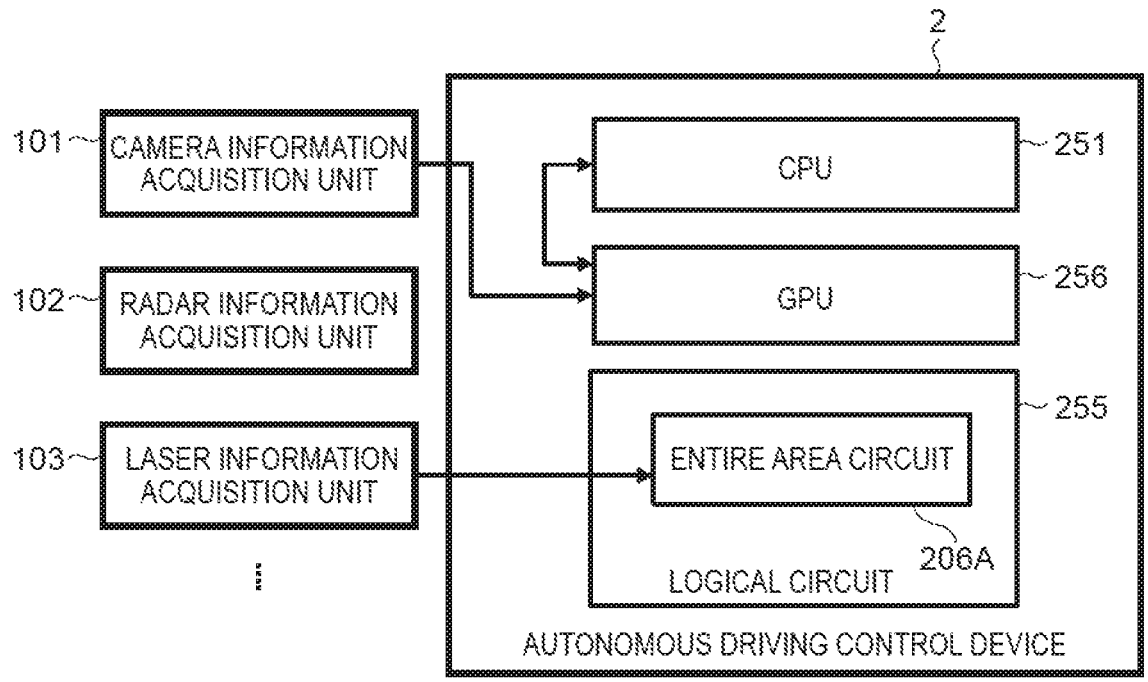
FIG. 9C is a diagram showing the association of the acquired information and the hardware 205 based on the specification C.
Figure 9D:
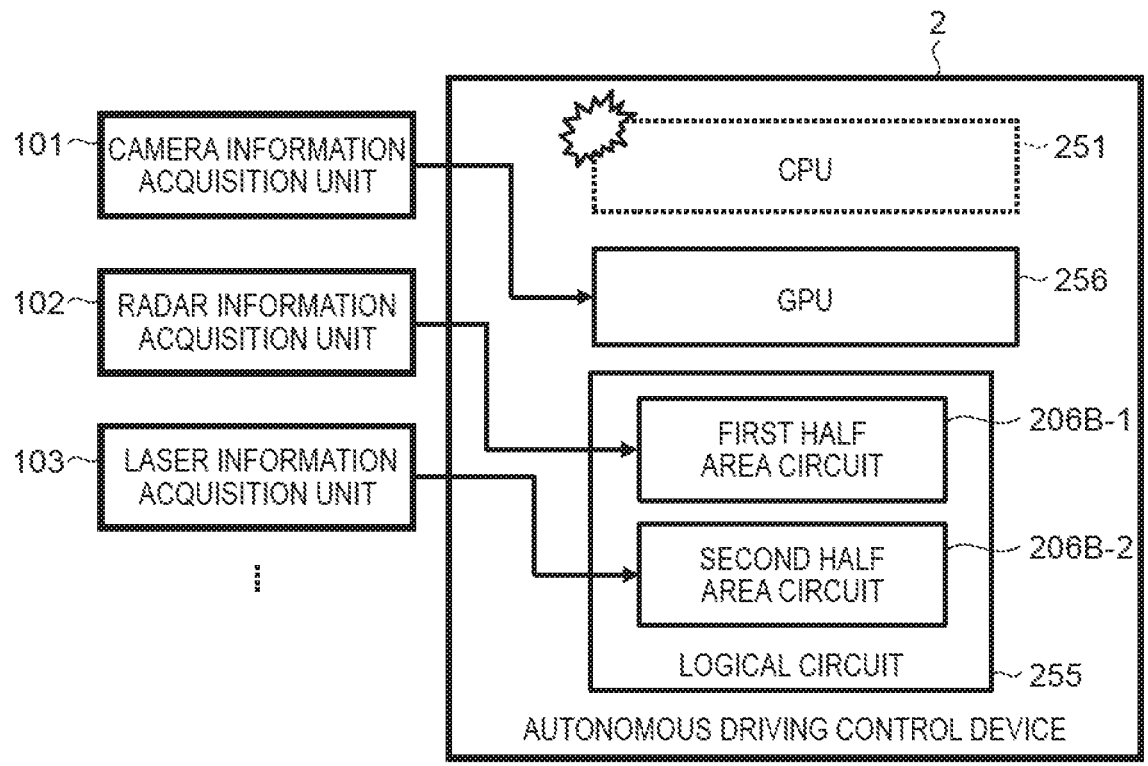
FIG. 9D is a diagram showing the association of the acquired information and the hardware 205 based on the specification D.
Figure 9E:
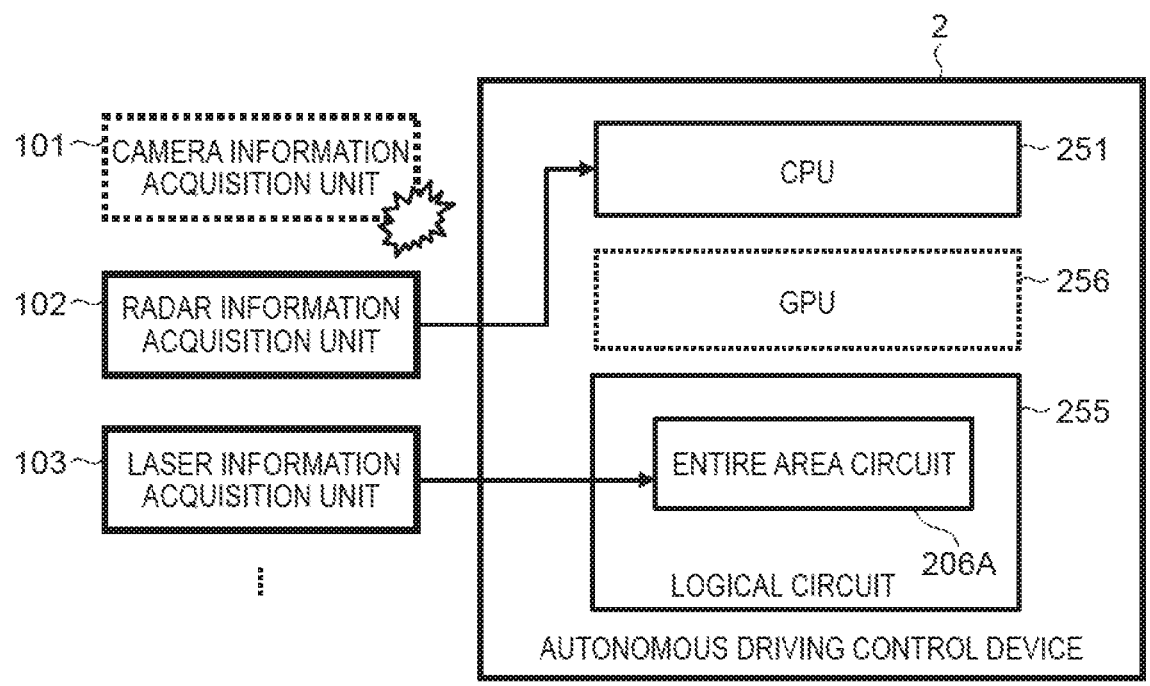
FIG. 9E is a diagram showing the association of the acquired information and the hardware 205 based on the specification E.

FIG. 9C is a diagram showing a case when the processing specification 303 is the "specification C", and shows that, when deterioration of the sensor accuracy is detected from the radar information, the camera information is processed by the GPU 256, the laser information is processed by the logical circuit 255, and the radar information is not processed. This example shows that, in order to supplement the range of detection of the radar information in which the detection accuracy has deteriorated, for example, the CPU 251 assists the GPU 256 in processing the camera information. FIG. 9D is a diagram showing a case when the processing specification 303 is the "specification D", and shows that, when a failure of the CPU 251 is detected, the camera information is processed by the GPU 256, and the radar information and the laser information are processed by the two logical circuits configured in the logical circuit 255. For instance, this example shows that, in order to supplement the insufficient processing resources, the processing specification of the radar information and the laser information is mitigated, and information is processed by being reduced in the logical circuit 255. FIG. 9E is a diagram showing a case when the processing specification 303 is the "specification E", and shows that, when a failure of the camera information is detected, the radar information is processed by the CPU 251, the laser information is processed by the logical circuit 255, and the camera information is not processed.

According to the foregoing embodiment, the following operation and effect are yielded.

(1) An autonomous driving control device 2 is mounted on a vehicle 100 equipped with hardware 205 capable of operation. The autonomous driving control device 2 comprises an information collection unit 202 which collects external information of the vehicle 100, a flash memory 254 which stores a processing assignment DB 3 describing a plurality of processing specifications which prescribe processing to be executed by each of the hardware 205 and the external information to be used by the hardware 205 for performing operation, and an applicable condition, which is a condition related to the external information and a status of the hardware 205 for applying each of the plurality of processing specifications, and a processing control unit 203 which determines one processing specification among the plurality of processing specifications from a correspondence to the condition based on the collected external information and the status of the hardware 205, and controls the plurality of hardware based on the determined processing specification. Thus, the autonomous driving control device 2 can optimally control the hardware 205 capable of operation according to the external environment and the status of the hardware 205 capable of operation. Moreover, power consumption can also be reduced by realizing the optimal control of the hardware 205.

(2) At least one among the hardware 205 is a logical circuit 255, which is a reconfigurable logical circuit. The flash memory 254 further stores a circuit management DB 4 which prescribes processing to be executed by the logical circuit 255 for each of the processing specifications. The processing control unit 203 causes the logical circuit 255 to execute processing based on the determined processing specification and the circuit management DB 4. The processing to be executed by the logical circuit 225 based a certain processing specification in the circuit management DB 4, for example, based on the specification B, includes processing to be executed by the GPU 256 based on the specification A. Thus, when a defect occurs in certain hardware, the autonomous driving control device 2 can cause the logical circuit 255 to perform the processing, which was being executed by the defective hardware, on behalf of such defective hardware.

(3) The processing to be executed by the logical circuit 255 based on the specification B in the circuit management DB 4 includes processing to be executed by the hardware 205 other than the logical circuit 255 based on the specification A; that is, processing to be executed by the GPU 256. Thus, when a defect occurs in the hardware 205 other than the logical circuit, the autonomous driving control device 2 can cause the logical circuit 255 to perform the processing, which was being executed by the defective hardware 205, on behalf of such defective hardware 205.

(4) As shown in the column of the switching condition 301 of the specification A and the specification B of FIG. 5, the applicable condition 300 includes the external circumstances, which are results of analyzing the collected external information. Thus, the autonomous driving control device 2 can control the hardware 205 by giving consideration to the external circumstances.

(5) As shown in the column of the switching condition 301 of the specification C of FIG. 5, the applicable condition 300 includes a recognition accuracy of the external information, which is a result of analyzing the collected external information. Thus, the autonomous driving control device 2 can control the hardware 205 by giving consideration to the recognition accuracy of the external information.

(6) As shown in the column of the switching condition 301 of the specification D of FIG. 5, the applicable condition 300 includes an occurrence of a failure in the plurality of hardware. Thus, the autonomous driving control device 2 can control the hardware by giving consideration to the status of failure in the hardware being monitored by the monitoring unit 207.

(7) Collection of the external information is performed with sensors such as a camera, a laser, and a radar. As shown in the column of the switching condition 301 of the specification E of FIG. 5, the applicable condition 300 includes a failure of the sensor. Thus, the autonomous driving control device 2 can control the hardware 205 by giving consideration to the failure of the sensor.

(8) The applicable condition for each of the processing specifications is a combination of a switching condition indicating a condition and a switching priority indicating a priority to be applied. The processing control unit 203 determines the processing specification in which the switching priority is high when a plurality of the switching conditions are applicable. Thus, the autonomous driving control device 2 can change the processing specification to be applied according to a predetermined priority.

(変形例1)

In the foregoing embodiment, the autonomous driving control device 2 was equipped with the CPU 251, the logical circuit 255, and the GPU 256 as the hardware capable of operation. Nevertheless, the autonomous driving control device 2 may additionally comprise other hardware capable of operation, such as a DSP (digital signal processor). Moreover, the autonomous driving control device 2 may comprise a plurality of hardware of the same type. When the CPU 251 comprises a plurality of physical cores, the CPU 251 may handle each physical core as different hardware, or handle the physical cores as one hardware in units of several physical cores. Furthermore, the CPU 251 may use hardware multi-threading technology and handle one physical core as a plurality of logical cores, and handle each of the logical cores as different hardware.

(変形例2)

In the foregoing embodiment, the functional configuration of the autonomous driving control device 2 is merely an example, and a certain function may be equipped in another configuration, or a plurality of function parts may be integrated. For example, the information collection unit 202 and the processing control unit 203 may be integrated. As an example of changing the division of functions in the foregoing embodiment, a case of the processing control unit 203 executing the data transmission to the hardware 205 as the function which was handled by the information collection unit 202 is now explained.

FIG. 10 is a sequence diagram of a case where the processing control unit 203 executes the data transmission to the hardware 205. In other words, FIG. 10 corresponds to FIG. 8 in the foregoing embodiment. FIG. 10 differs from FIG. 8 with respect to the point that the information collection unit 202 transfers the data to the hardware 205 or the processing control unit 203. In FIG. 10, the processing control unit 203 transfers, to the hardware 205, the data acquired from the information collection unit 202. By going through the processing control unit 203 when transferring the data, it is possible to transfer only the data of the processing control unit 203 required as the accelerator.

Step S801 to step S806 of FIG. 10 are the same as FIG. 8. After step S806, the processing control unit 203 instructs the information collection unit 202 to start the transfer of the camera information, the radar information, and the laser information (S837). The information collection unit 202 transfers the data to the processing control unit 203 (S838). Since the processing specification 303 is the specification D, the processing control unit 203 refers to the transfer DB 6 shown in FIG. 7, and determines that the GPU 256 is the transfer destination of the camera information, and that the logical circuit 255 is the transfer destination of the radar information and the laser information.

Next, the processing control unit 203 adjusts the transfer timing of transferring the data to the hardware 205 of each transfer destination (S839), and then transfers the data (S840). The processing control unit 203 adjusts the timing of transferring data to the hardware 205 of each transfer destination by giving consideration to the processing performance and the processing time which differ depending on the type of hardware. In the cycle L1 of FIG. 10, the processing control unit 203 transfers the camera information to the GPU 256 realized with a GPU, and transfers the radar information and the laser information to the logical circuit 225 realized with a logical circuit, and does not transfer any data to the CPU 251 realized with a CPU. Next, each hardware 205 performs arithmetic processing as needed using the received data (S841), and notifies the processing result to the processing control unit 203 (S842). Subsequent steps S813 and S814 are the same as FIG. 8. This concludes the explanation of the transition diagram shown in FIG. 10.

(変形例3)

In the foregoing embodiment, the autonomous driving control device 2 was equipped with the CPU 251, the logical circuit 255, and the GPU 256 as the hardware capable of operation. Nevertheless, the autonomous driving control device 2 may comprise at least two hardware as the hardware capable of operation. For example, the autonomous driving control device 2 does not need to comprise one among the CPU 251, the logical circuit 255, and the GPU 256. Moreover, the autonomous driving control device 2 may also adopt a configuration of comprising any of the two hardware capable of operation other than the CPU 251, the logical circuit 255, and the GPU 256, for example, including the DSP. For example, the autonomous driving control device 2 may comprise the GPU 256 and the DSP, determine one processing specification among a plurality of processing specifications from the correspondence to the condition based on the collected external information and the status of the GPU 256 and the DSP, and control the GPU 256 and the DSP based on the determined processing specification.

Note that the present invention is not limited to the embodiment described above, and includes various modified examples and equivalent configurations within the scope of the appended claims. For example, the foregoing embodiment was explained in detail for explaining the present invention in an easy-to-understand manner, and the present invention does not need to necessarily comprise all of the configurations explained in the foregoing embodiment. Moreover, control lines and information lines are illustrated to the extent required for the explanation, and not all control lines and information lines required for the product are not necessarily illustrated. In effect, it should be understood that nearly all configurations are mutually connected.

In each of the embodiments and modified examples explained above, the programs are stored in the ROM 252, but the programs may also be stored in the flash memory 254. Moreover, the autonomous driving control device 2 may comprise an I/O interface (not shown), and the programs may also be read from another device via the I/O interface and a medium that can be used by the autonomous driving control device 2 when required. Here, as the medium, for example, used may be a storage medium that can be attached to and detached from an I/O interface, or a communication medium such as a wired, wireless or optical network, or carrier waves or digital signals that are transmitted on such network. Moreover, a part or all of the functions realized by the programs may be realized with a hardware circuit or FPGA.

Each of the embodiments and modified examples described above may respectively be combined. While various embodiments and modified examples were explained above, the present invention is not limited to the subject matter thereof. Other modes considered to fall within the technical concept of the present invention also fall within the scope of the present invention.

The disclosure of the following priority application is incorporated herein by way of reference.

Japanese Patent Application No. 2018-73248 (filed on Apr. 5, 2018)

REFERENCE SIGNS LIST

2 . . . autonomous driving control device
3 . . . processing assignment database
4 . . . circuit management database
5 . . . circuit database
6 . . . transfer database
100 . . . vehicle
202 . . . information collection unit
203 . . . processing control unit
204 . . . operation unit
205 . . . hardware
207 . . . monitoring unit
251 . . . CPU
254 . . . flash memory
255 . . . logical circuit
256 . . . GPU

The invention claimed is:

1. An electronic control device to be mounted on a vehicle equipped with a plurality of hardware capable of operation, comprising:
   an information collection unit which collects external information of the vehicle;
   a storage unit which stores a plurality of processing specifications, wherein the processing specifications prescribe processing to be executed by each of the plurality of hardware and the processing specifications prescribe the external information to be used by the plurality of hardware for performing operation, and an applicable condition, which is a condition related to the external information and a status of the plurality of hardware for applying each of the plurality of processing specifications; and
   a processing control unit which determines one processing specification among the plurality of processing specifications from a correspondence to the condition based on the collected external information and the status of the plurality of hardware, and controls the plurality of hardware based on the determined processing specification.

2. The electronic control device according to claim 1, wherein:
   at least one hardware among the plurality of hardware is a first logical circuit, which is a reconfigurable logical circuit;

the storage unit further stores circuit management information which prescribes processing to be executed by the first logical circuit for each of the processing specifications;

the processing control unit causes the first logical circuit to execute processing based on the determined processing specification and the circuit management information; and the processing to be executed by the first logical circuit is based on a first processing specification in the circuit management information and is also based on processing to be executed by hardware other than the first logical circuit among the plurality of hardware based on a second processing specification that differs from the first processing specification.

3. The electronic control device according to claim 2, wherein:

the processing to be executed by the first logical circuit based on the first processing specification in the circuit management information includes processing to be executed by hardware other than a logical circuit based on the second processing specification.

4. The electronic control device according to claim 1, wherein:

the applicable condition includes the external circumstances, which are results of analyzing the collected external information.

5. The electronic control device according to claim 1, wherein:

the applicable condition includes a recognition accuracy of the external information, which is a result of analyzing the collected external information.

6. The electronic control device according to claim 1, wherein:

the applicable condition includes an occurrence of a failure in the plurality of hardware.

7. The electronic control device according to claim 1, wherein:

collection of the external information is performed with a sensor; and the applicable condition includes a failure of the sensor.

8. The electronic control device according to claim 1, wherein:

the applicable condition for each of the processing specifications is a combination of a switching condition indicating a condition and a switching priority indicating a priority to be applied; and the processing control unit determines the processing specification in which the switching priority is high when a plurality of the switching conditions are applicable.

9. A control method to be executed by an electronic control device to be mounted on a vehicle comprising a plurality of hardware capable of operation, and comprising a storage unit which stores a plurality of processing specifications and an applicable condition, which is a condition for applying each of the plurality of processing specifications, wherein:

the processing specification is used for prescribing processing to be executed by each of the plurality of hardware and external information of the vehicle to be used by the plurality of hardware for performing operation;

the applicable condition is related to the external information and a status of the plurality of hardware; and the control method includes:

collecting external information of the vehicle; and determining one processing specification among the plurality of processing specifications from a correspondence to the condition based on the collected external information and the status of the plurality of hardware, and controlling the plurality of hardware based on the determined processing specification.

10. The control method according to claim 9, wherein:

at least one hardware among the plurality of hardware is a first logical circuit, which is a reconfigurable logical circuit;

the storage unit further stores circuit management information which prescribes processing to be executed by the first logical circuit for each of the processing specifications; and the control method further includes:

causing the first logical circuit to execute processing based on the determined processing specification and the circuit management information; and the processing to be executed by the first logical circuit based on a first processing specification in the circuit management information includes processing to be executed by hardware other than the first logical circuit among the plurality of hardware based on a second processing specification that differs from the first processing specification.

11. The control method according to claim 10, wherein:

the control method further includes:

the processing to be executed by the first logical circuit based on the first processing specification in the circuit management information includes processing to be executed by hardware other than a logical circuit based on the second processing specification.

* * * * *